United States Patent
Hsieh

(10) Patent No.: US 11,434,366 B2
(45) Date of Patent: Sep. 6, 2022

(54) RESIN COMPOSITION AND ARTICLE MADE THEREFROM

(71) Applicant: Elite Material Co., Ltd., Taoyuan (TW)

(72) Inventor: Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 298 days.

(21) Appl. No.: 16/713,918

(22) Filed: Dec. 13, 2019

(65) Prior Publication Data

US 2021/0130610 A1 May 6, 2021

(30) Foreign Application Priority Data

Oct. 31, 2019 (TW) .................. 108139493

(51) Int. Cl.
| | | |
|---|---|---|
| *C08L 71/12* | (2006.01) | |
| *C08L 25/10* | (2006.01) | |
| *C08L 33/06* | (2006.01) | |
| *C08L 47/00* | (2006.01) | |
| *C08K 3/013* | (2018.01) | |
| *C08J 5/24* | (2006.01) | |
| *C08K 3/26* | (2006.01) | |

(52) U.S. Cl.
CPC .............. *C08L 71/126* (2013.01); *C08J 5/24* (2013.01); *C08K 3/013* (2018.01); *C08K 3/26* (2013.01); *C08L 25/10* (2013.01); *C08L 33/064* (2013.01); *C08L 47/00* (2013.01); *C08K 2003/267* (2013.01); *C08L 2201/08* (2013.01); *C08L 2203/16* (2013.01); *C08L 2203/20* (2013.01)

(58) Field of Classification Search
CPC .................. C08L 71/126; C08L 35/04–14
See application file for complete search history.

(56) References Cited

U.S. PATENT DOCUMENTS

2007/0029682 A1* 2/2007 Aoki ............... H01L 23/293
257/793
2019/0330500 A1* 10/2019 Shen ............... C08L 53/025

FOREIGN PATENT DOCUMENTS

TW        201710363 A     *  3/2017

OTHER PUBLICATIONS

TW 201710363 A abstract translation (2017).*

* cited by examiner

*Primary Examiner* — Ana L. Woodward
(74) *Attorney, Agent, or Firm* — Muncy, Geissler, Olds & Lowe, P.C.

(57) ABSTRACT

A resin composition includes a vinyl group-containing polyphenylene ether resin, a polyolefin and a magnesium and aluminum combination ionic compound, wherein the magnesium and aluminum combination ionic compound has a thermal resistance of greater than or equal to 600° C. The resin composition may be used to make various articles, such as a prepreg, a resin film, a laminate or a printed circuit board, and at least one of the following improvements can be achieved, including glass transition temperature, copper foil peeling strength, thermal resistance and dissipation factor.

10 Claims, No Drawings

RESIN COMPOSITION AND ARTICLE MADE THEREFROM

CROSS-REFERENCE TO RELATED APPLICATION

This application claims the priority benefits of Taiwan Patent Application No. 108139493, filed on Oct. 31, 2019. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

With the rapid development of electronic technology, the demands for electrical properties of products such as printed circuit boards have become increasingly challenging. From the perspective of insulation materials used in printed circuit boards and other articles, conventional resin compositions containing a polyphenylene ether and a polyolefin have been proposed to meet the needs of electrical properties of the materials; however, articles such as copper-clad laminates made from resin compositions containing a polyphenylene ether and a polyolefin fail to satisfy some properties, such as having insufficient glass transition temperature.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

Specifically, disclosed herein is a resin composition comprising: a vinyl-containing polyphenylene ether resin, a polyolefin and a magnesium and aluminum combination ionic compound, wherein the magnesium and aluminum combination ionic compound has a thermal resistance of greater than or equal to 600° C.

In one embodiment, the vinyl group-containing polyphenylene ether resin comprises a vinylbenzyl group-containing polyphenylene ether resin, a methacrylate group-containing polyphenylene ether resin, an allyl group-containing polyphenylene ether resin, a vinylbenzyl group-modified bisphenol A polyphenylene ether resin, a chain-extended vinyl group-containing polyphenylene ether resin or a combination thereof.

In one embodiment, the polyolefin comprises styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene terpolymer, styrene-ethylene-butylene-styrene terpolymer, polybutadiene, maleic anhydride-butadiene copolymer, methyl styrene copolymer or a combination thereof.

The amount of each component used in the resin composition disclosed herein is not particularly limited and may be adjusted according to the properties needed. For example, with the proviso that various objects of the present disclosure can be met, the content or ratio of each component in the resin composition according to the present disclosure may be adjusted as needed, such as according to the properties of the articles made therefrom.

For example, the resin composition may comprise 100 parts by weight of the vinyl group-containing polyphenylene ether resin, 5 to 150 parts by weight of the polyolefin and 0.1 to 5 parts by weight of the magnesium and aluminum combination ionic compound having a thermal resistance of greater than or equal to 600° C. In addition, the resin composition may comprise 100 parts by weight of the vinyl group-containing polyphenylene ether resin, 15 to 24 parts by weight of the polyolefin and 0.15 to 3.5 parts by weight of the magnesium and aluminum combination ionic compound having a thermal resistance of greater than or equal to 600° C.

In addition to the aforesaid components, the resin composition disclosed herein may further optionally comprise: a maleimide resin, a small molecule vinyl compound, an acrylate, an epoxy resin, a cyanate ester resin, a phenolic resin, a benzoxazine resin, a styrene maleic anhydride, a polyester resin, an amine curing agent, a polyamide resin, a polyimide resin or a combination thereof.

In addition to the aforesaid components, the resin composition disclosed herein may also further optionally comprise: flame retardant, inorganic filler, curing accelerator, polymerization inhibitor, solvent, silane coupling agent, coloring agent, toughening agent or a combination thereof.

Another main object of the present disclosure is to provide an article made from the aforesaid resin composition, comprising a prepreg, a resin film, a laminate or a printed circuit board.

In one embodiment, articles made from the resin composition disclosed herein have one, more or all of the following properties:
- a glass transition temperature as measured by reference to IPC-TM-650 2.4.24.4 of greater than or equal to 190° C.;
- a copper foil peeling strength as measured by reference to IPC-TM-650 2.4.8 of greater than or equal to 3.30 lb/in;
- a T300 thermal resistance as measured by reference to IPC-TM-650 2.4.24.1 of greater than 120 minutes; and
- a dissipation factor as measured by reference to JIS C2565 at 10 GHz of less than or equal to 0.0040.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$," and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

As described above, the present disclosure primarily aims to provide a resin composition, comprising: a vinyl group-containing polyphenylene ether resin, a polyolefin and a magnesium and aluminum combination ionic compound, wherein the magnesium and aluminum combination ionic compound has a thermal resistance of greater than or equal to 600° C.

According to the present disclosure, the vinyl group-containing polyphenylene ether resin refers to a polyphenylene ether resin having an ethylenic carbon-carbon double bond (C=C) or a functional group derived therefrom, examples including but not limited to the presence of a vinyl group, an allyl group, a vinylbenzyl group, a methacrylate group or the like in the polyphenylene ether resin. Unless otherwise specified, the position of the aforesaid functional group is not particularly limited and may be located at the terminal of a long-chain structure. For example, in one embodiment, the vinyl group-containing polyphenylene ether resin comprises a methacrylate group-containing polyphenylene ether resin. In another embodiment, the vinyl group-containing polyphenylene ether resin comprises a vinylbenzyl group-containing polyphenylene ether resin. In still another embodiment, the vinyl group-containing polyphenylene ether resin contains at the same time two different polyphenylene ether resins containing an ethylenic carbon-carbon double bond (C=C) or a functional group derived therefrom, such as containing at the same time a vinylbenzyl group-containing polyphenylene ether resin and a methacrylate group-containing polyphenylene ether resin, wherein the content or ratio thereof is not particularly limited and may be adjusted as needed.

As used herein, unless otherwise specified, the vinyl group-containing polyphenylene ether resin also encompasses its modification, and examples of the modification may comprise, but not limited to, a product derived from a vinyl group-containing polyphenylene ether resin with its reactive functional group modified, a product derived from a prepolymerization reaction of a vinyl group-containing polyphenylene ether resin and other resins, a product derived from a crosslinking reaction of a vinyl group-containing polyphenylene ether resin and other resins, a product derived from homopolymerizing a vinyl group-containing polyphenylene ether resin, a product derived from copolymerizing a vinyl group-containing polyphenylene ether resin and another different vinyl group-containing polyphenylene ether resin, etc.

In one embodiment, the vinyl group-containing polyphenylene ether resin comprises a vinylbenzyl group-containing polyphenylene ether resin, a methacrylate group-containing polyphenylene ether resin, an allyl group-containing polyphenylene ether resin, a vinylbenzyl group-modified bisphenol A polyphenylene ether resin, a chain-extended vinyl group-containing polyphenylene ether resin or a combination thereof.

For example, according to the present disclosure, examples of the vinyl group-containing polyphenylene ether resin may include but are not limited to vinylbenzyl group-containing polyphenylene ether resin (e.g., OPE-2st 2200, available from Mitsubishi Gas Chemical Co., Inc.), methacrylate group-containing polyphenylene ether resin (e.g., SA-9000, available from Sabic), allyl group-containing polyphenylene ether resin, vinylbenzyl group-modified bisphenol A polyphenylene ether resin, chain-extended vinyl group-containing polyphenylene ether resin, or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

In addition, for example, in the present disclosure, the vinyl group-containing polyphenylene ether resin may comprise a structure of Formula (A):

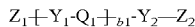    Formula (A)

wherein b1 is a natural number of 0 to 10;

$Q_1$ comprises a structure of any one of Formula (A-1) to Formula (A-3):

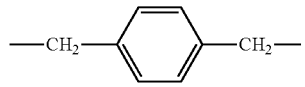    Formula (A-1)

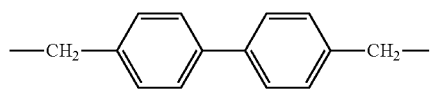    Formula (A-2)

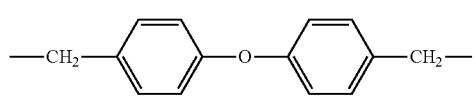    Formula (A-3)

$Y_1$ and $Y_2$ independently comprise a structure of Formula (A-4):

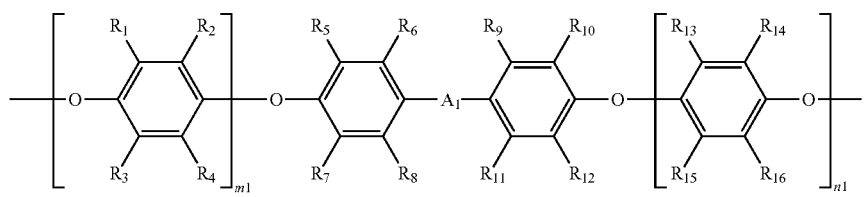    Formula (A-4)

in Formula (A-4), m1 and n1 independently represent an integer of 1 to 30, such as 1, 5, 10, 15, 20, 25 or 30; $R_1$ to $R_{16}$ are independently selected from H, —$CH_3$ and a halogen atom (e.g., chlorine, bromine, or iodine); $A_1$ is selected from a covalent bond, —$CH_2$—, —CH($CH_3$)—, —$C(CH_3)_2$—, —O—, —S—, —$SO_2$— and a carbonyl group;

$Z_1$ and $Z_2$ independently comprise a structure of any one of Formula (A-5) to Formula (A-7):

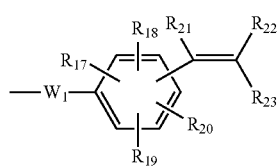    Formula (A-5)

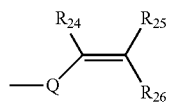    Formula (A-6)

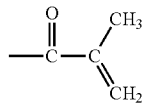    Formula (A-7)

wherein $R_{17}$ to $R_{26}$ are individually selected from H, —$CH_3$ or a halogen atom, and $W_1$ and Q are individually a $C_1$ to $C_3$ bivalent aliphatic group (e.g., methylene, ethylene or propylene).

In one embodiment, the polyolefin comprises, but not limited to, styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene terpolymer, styrene-ethylene-butylene-styrene terpolymer, polybutadiene (i.e., homopolymer of butadiene), maleic anhydride-butadiene copolymer, methyl styrene copolymer or a combination thereof. Preferably, the polyolefin comprises styrene-butadiene copolymer, hydrogenated styrene-butadiene copolymer, styrene-ethylene-butylene-styrene terpolymer, polybutadiene, maleic anhydride-butadiene copolymer or a combination thereof.

In one embodiment, the magnesium and aluminum combination ionic compound having a thermal resistance of greater than or equal to 600° C. may comprise powdered aluminum-based, magnesium-based and magnesium and aluminum combination inorganic compounds and have a thermal resistance of greater than or equal to 600° C. For example, the magnesium and aluminum combination ionic compound having a thermal resistance of greater than or equal to 600° C. may be an anion exchange magnesium and aluminum combination ionic compound, which may be used to trap ionized anions, wherein the magnesium and aluminum combination ionic compound is preferably a carbonate compound containing magnesium and aluminum. In one embodiment, the magnesium and aluminum combination ionic compound having a thermal resistance of greater than or equal to 600° C. has a thermal resistance of greater than or equal to 600° C. as measured by thermogravimetric analysis (TGA), such as between 600° C. and 900° C., preferably between 600° C. and 800° C., between 600° C. and 750° C., between 600° C. and 700° C. or between 600° C. and 650° C. For example, the magnesium and aluminum combination ionic compound having a thermal resistance of greater than or equal to 600° C. may be available from Toagosei Co., Ltd. under the tradename IXE-700F, which is a magnesium and aluminum combination ionic compound (e.g., a carbonate compound containing magnesium and aluminum and having a thermal resistance of about 600° C.), but not limited thereto.

Unless otherwise specified, the amount and ratio of the vinyl group-containing polyphenylene ether resin, the polyolefin and the magnesium and aluminum combination ionic compound having a thermal resistance of greater than or equal to 600° C. may be adjusted if needed.

For example, relative to 100 parts by weight of the vinyl group-containing polyphenylene ether resin, the resin composition of the present disclosure may contain 5 to 150 parts by weight of the polyolefin, such as 5 to 80 parts by weight, 5 to 40 parts by weight or 15 to 24 parts by weight, but not limited thereto.

For example, relative to 100 parts by weight of the vinyl group-containing polyphenylene ether resin, the resin composition of the present disclosure may contain 0.1 to 5 parts by weight of the magnesium and aluminum combination ionic compound having a thermal resistance of greater than or equal to 600° C., such as 0.1 to 4 parts by weight or 0.15 to 3.5 parts by weight, but not limited thereto.

In one embodiment, the resin composition comprises 100 parts by weight of the vinyl group-containing polyphenylene ether resin, 5 to 150 parts by weight of the polyolefin and 0.1 to 5 parts by weight of the magnesium and aluminum combination ionic compound having a thermal resistance of greater than or equal to 600° C.

In one embodiment, the resin composition comprises 100 parts by weight of the vinyl group-containing polyphenylene ether resin, 15 to 24 parts by weight of the polyolefin and 0.15 to 3.5 parts by weight of the magnesium and aluminum combination ionic compound having a thermal resistance of greater than or equal to 600° C.

In one embodiment, the resin composition disclosed herein may further optionally comprise a crosslinking agent, such as: a maleimide resin, a small molecule vinyl compound, an acrylate, an epoxy resin, a cyanate ester resin, a phenolic resin, a benzoxazine resin, a styrene maleic anhydride, a polyester resin, an amine curing agent, a polyamide resin, a polyimide resin or a combination thereof. The amount of each component described above may be adjusted as needed; for example, relative to 100 parts by weight of the vinyl group-containing polyphenylene ether resin, the amount of each component described above may independently be between 5 parts by weight and 150 parts by weight, preferably between 10 parts by weight and 90 parts by weight, and more preferably between 10 parts by weight and 50 parts by weight, but not limited thereto.

For example, the maleimide resin may refer to a compound or a mixture containing at least one maleimide group. Unless otherwise specified, the maleimide resin used in the present disclosure is not particularly limited and may include any one or more maleimide resins useful for making a prepreg, a resin film, a laminate or a printed circuit board. Examples include but are not limited to 4,4'-diphenylmethane bismaleimide, oligomer of phenylmethane maleimide (a.k.a. polyphenylmethane maleimide), bismaleimide toluene, diethylbismaleimide toluene, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenyl maleimide, a maleimide containing aliphatic long-chain structure, or a combination thereof. Preferably, the maleimide resin is a maleimide resin containing aliphatic long-chain structure. In addition, unless otherwise specified, the aforesaid maleimide resin of the present disclosure may comprise a prepolymer thereof, such as a prepolymer of diallyl compound and maleimide compound, a prepolymer of diamine and maleimide compound, a prepolymer of multi-functional amine and maleimide compound or a prepolymer of acid phenol compound and maleimide compound, but not limited thereto.

For example, the above-mentioned maleimide resin may include products such as BMI-1000, BMI-1000H, BMI-1100, BMI-1100H, BMI-2000, BMI-2300, BMI-3000, BMI-3000H, BMI-4000, BMI-4000H, BMI-5000, BMI-5100, BM-7000 and BMI-7000H available from Daiwakasei Co., Ltd., products such as BMI-70 and BMI-80 available from K.I Chemical Industry Co., Ltd., or products such as Compimide MDAB, Compimide TDAB, and Compimide DE-TDAB available from Evonik Industries.

For example, the maleimide resin containing aliphatic long-chain structure may include products such as BMI-689, BMI-1400, BMI-1500, BMI-1700, BMI-2500, BMI-3000, BMI-3000J, BMI-3000G, BMI-3000GE, BMI-5000 and BMI-6000 available from Designer Molecules Inc.

In a preferred embodiment, relative to 100 parts by weight of the vinyl group-containing polyphenylene ether resin, the resin composition according to the present disclosure contains 5 to 80 parts by weight, 10 to 50 parts by weight or 10 to 30 parts by weight of the maleimide resin.

For example, the small molecule vinyl compound as used herein refers to a vinyl-containing compound with a molecular weight of less than or equal to 1000, preferably a vinyl-containing compound with a molecular weight of between 100 and 900 and more preferably between 100 and 800. According to the present disclosure, the small molecule vinyl compound may include, but not limited to, bis(vinylbenzyl) ether (BVBE), bis(vinylphenyl)ethane (BVPE), triallyl isocyanurate (TAIC), triallyl cyanurate (TAC), 1,2,4-trivinyl cyclohexane (TVCH) or a combination thereof.

In a preferred embodiment, relative to 100 parts by weight of the vinyl group-containing polyphenylene ether resin, the resin composition according to the present disclosure contains 3 to 50 parts by weight, 5 to 40 parts by weight or 5 to 35 parts by weight of the small molecule vinyl compound.

For example, the acrylate may include, but not limited to, tricyclodecane di(meth)acrylate, tri(meth)acrylate, 1,1'-[(octahydro-4,7-methano-1H-indene-5,6-diyl) bis(methylene)] ester (e.g., SR833S, available from Sartomer) or a combination thereof.

In a preferred embodiment, relative to 100 parts by weight of the vinyl group-containing polyphenylene ether resin, the resin composition according to the present disclosure contains 3 to 50 parts by weight, 5 to 40 parts by weight or 5 to 35 parts by weight of the acrylate.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, and isocyanate-modified epoxy resin. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin, wherein the phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the cyanate ester resin may include any one or more cyanate ester resins useful for preparing a prepreg, a resin film, a laminate or a printed circuit board, such as a compound having an Ar—O—C≡N structure, wherein Ar may be a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be bisphenol A novolac cyanate ester resin, bisphenol F novolac cyanate ester resin or a combination thereof. For example, the cyanate ester resin may be available under the tradename Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Lonza.

For example, the phenolic resin may comprise but not limited to mono-functional, bifunctional or multifunctional phenolic resin, comprising phenolic resin of a resin composition conventionally used for making prepregs, such as phenoxy resin, novolac resin, etc.

For example, the benzoxazine resin includes, but not limited to, bisphenol A benzoxazine resin, bisphenol F benzoxazine resin, phenolphthalein benzoxazine resin, dicyclopentadiene benzoxazine resin, phosphorus-containing benzoxazine resin, oxydianiline benzoxazine resin, or unsaturated bond-containing benzoxazine resin, such as but not limited to LZ-8270, LZ-8280, LZ-8290 or LZ-8298 available from Huntsman, HFB-2006M available from Showa High Polymer, or KZH-5031 available from Kolon Industries Inc.

For example, in the styrene maleic anhydride, the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope.

For example, the polyester resin may be prepared by esterification of dicarboxylic aromatic compounds with dihydroxyl aromatic compounds. Examples of the polyester resin include, but not limited to, HPC-8000, HPC-8150 or HPC-8200 available from D.I.C. Corporation.

For example, the amine curing agent may include, but not limited to, any one or a combination of diamino diphenyl sulfone, diamino diphenyl methane, diamino diphenyl ether, diamino diphenyl sulfide and dicyandiamide.

For example, the polyamide resin may be any polyamide resin known in the field to which this disclosure pertains, including but not limited to various commercially available polyamide resin products.

For example, the polyimide resin may be any polyimide resin known in the field to which this disclosure pertains, including but not limited to various commercially available polyimide resin products.

In one embodiment, the resin composition disclosed herein may optionally further comprise: flame retardant, inorganic filler, curing accelerator, polymerization inhibitor, solvent, silane coupling agent, coloring agent, toughening agent or a combination thereof.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate, aluminium phosphate (e.g., commercially available OP-930 and OP-935), and a combination thereof. For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac).

For example, the inorganic filler may be any one or more inorganic fillers used for preparing a prepreg, a resin film, a laminate or a printed circuit board; examples of the inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, silicon nitride, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like in shape and can be optionally pretreated by a silane coupling agent.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethyl aminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butyl peroxy)-3-hexyne (25B), bis(tert-butylperoxyisopropyl) benzene or a combination thereof.

For example, the polymerization inhibitor is not particularly limited and may be any polymerization inhibitors known in the field to which this disclosure pertains, including but not limited to various commercially available polymerization inhibitor products.

For example, the solvent is not particularly limited and may be any solvent suitable for dissolving the resin composition disclosed herein, example including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin compositions of various embodiments may be used for making different articles, including but not limited to a prepreg, a resin film, a laminate or a printed circuit board.

For example, the resin composition according to each of the various embodiments may be used to make a prepreg, which has a reinforcement material and a layered structure (e.g., insulation layer) formed thereon, wherein the layered structure is made by heating the resin composition to a semi-cured state (B-Stage) at a temperature for example between 120° C. and 160° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition according to each of the various embodiments may be coated on a liquid crystal resin film, a polyester (PET) film, a polyimide (PI) film, a copper foil or a resin-coated copper (RCC), followed by baking and heating to the semi-cured state (B-Stage) to obtain a resin film.

For example, resin compositions of various embodiments of the present disclosure may be made into a laminate, such as a copper-clad laminate, which comprises two copper foils and an insulation layer disposed between the copper foils, wherein the insulation layer is formed by curing the resin compositions at high temperature and high pressure, a suitable curing temperature being for example between 190° C. and 220° C. and preferably between 200° C. and 215° C. and a suitable curing time being 90 to 180 minutes and preferably 110 to 150 minutes. The insulation layer may be obtained by curing the aforesaid prepreg or resin film. In one preferred embodiment, the laminate is a copper-clad laminate.

In one embodiment, the laminate may be further processed by trace formation processes to provide a printed circuit board.

Articles made from the resin composition according to the present disclosure have one or more preferred properties including high glass transition temperature, high copper foil peeling strength, high T300 thermal resistance and low dissipation factor.

For example, articles made from the resin composition according to the present disclosure may achieve one, more or all of the following properties:

a glass transition temperature as measured by reference to IPC-TM-650 2.4.24.4 of greater than or equal to 190° C., such as greater than or equal to 195° C., greater than or equal to 200° C., or greater than or equal to 210° C., such as between 190° C. and 214° C., or between 195° C. and 214° C.;

a copper foil peeling strength as measured by reference to IPC-TM-650 2.4.8 of greater than or equal to 3.30 lb/in, such as between 3.30 lb/in and 3.42 lb/in;

a T300 thermal resistance as measured by reference to IPC-TM-650 2.4.24.1 of greater than 120 minutes, such as between 120 minutes and 150 minutes; and a dissipation factor as measured by reference to JIS C2565 at 10 GHz of less than or equal to 0.0040, such as between 0.0036 and 0.0039.

Materials and reagents used in Examples and Comparative Examples disclosed herein are listed below:

SA-9000: methacrylate group-containing polyphenylene ether resin, available from Sabic.

OPE-2st: OPE-2st 2200, vinylbenzyl group-containing polyphenylene ether resin, available from Mitsubishi Gas Chemical Co., Inc.

SA-90: dihydroxyl-terminated bisphenol A polyphenylene ether resin, available from Sabic.

Ricon 156: butadiene homopolymer, available from Cray Valley.

Ricon 181: styrene-butadiene copolymer, available from Cray Valley.

H-1051: styrene-ethylene-butylene-styrene terpolymer, available from Asahi Kasei Corp.

BMI-80: 2,2'-bis-[4-(4-maleimidephenoxy)phenyl]propane, available from K.I Chemical Industry Co., Ltd.

TAC: triallyl cyanurate, available from Sigma Aldrich.

TAIC: triallyl isocyanurate, available from Sigma Aldrich.

IXE-700F: magnesium and aluminum combination ionic compound having a thermal resistance of greater than or equal to 600° C., available from Toagosei Co., Ltd.

IXE-100: zirconium-based ionic compound having a thermal resistance of 550° C., available from Toagosei Co., Ltd.

IXE-800: zirconium-based ionic compound having a thermal resistance of 300° C., available from Toagosei Co., Ltd.

IXE-770D: magnesium and aluminum combination ionic compound having a thermal resistance of 300° C., available from Toagosei Co., Ltd.

hydroquinone: available from Scharlab.

25B: 2,5-dimethyl-2,5-di(t-butylperoxy)hexyne-3 peroxide, available from NOF Corporation.

SC-2500SVJ: spherical silica pre-treated by silane coupling agent, available from Admatechs.

toluene: available from Chambeco Group.

dimethylacetamide: source not limited.

Samples (specimens) were prepared as described below and tested and analyzed under specified conditions below.

1. Prepreg: Resin composition from each Example or each Comparative Example (in part by weight) was loaded to and well mixed in a stirred tank to form a varnish, which was then loaded to an impregnation tank; a fiberglass fabric (e.g., 2116 E-glass fiber fabric or 1080 E-glass fiber fabric, available from Asahi) was impregnated into the impregnation tank to adhere the resin composition onto the fiberglass fabric, followed by heating and baking at 140° C. for about 2.5 minutes to obtain a prepreg.
2. Copper-containing laminate (a.k.a. copper-clad laminate, 6-ply, formed by lamination of six prepregs): Two 18 μm HVLP (hyper very low profile) copper foils and six prepregs obtained from 2116 E-glass fiber fabrics impregnated with each Example or each Comparative Example and having a resin content of about 55% were prepared and stacked in the order of one copper foil, six prepregs and one copper foil, followed by lamination under vacuum at 30 kgf/cm² and 200° C. for 120 minutes to form a copper-containing laminate. Insulation layers were formed by laminating six sheets of prepreg between the two copper foils, and the resin content of the insulation layers is about 55%.
3. Copper-containing laminate (a.k.a. copper-clad laminate, 2-ply, formed by lamination of two prepregs): Two 18 μm HVLP (hyper very low profile) copper foils and two prepregs obtained from 1080 E-glass fiber fabrics impregnated with each Example or each Comparative Example and having a resin content of about 70% were prepared and stacked in the order of one copper foil, two prepregs and one copper foil, followed by lamination under vacuum at 30 kgf/cm² and 200° C. for 120 minutes to form a copper-containing laminate. Insulation layers were formed by laminating two sheets of prepreg between the two copper foils, and the resin content of the insulation layers is about 70%.
4. Copper-free laminate (6-ply, formed by lamination of six prepregs): Each aforesaid copper-containing laminate (6-ply) was etched to remove the two copper foils to obtain a copper-free laminate (6-ply) formed by laminating six sheets of prepreg and having a resin content of about 55%.
5. Copper-free laminate (2-ply, formed by lamination of two prepregs): Each aforesaid copper-containing laminate (2-ply) was etched to remove the two copper foils to obtain a copper-free laminate (2-ply) formed by laminating two sheets of prepreg and having a resin content of about 70%.

For each sample, test items and test methods are described below.

Glass Transition Temperature (Tg)

A copper-free laminate sample (obtained by laminating six prepregs) was subject to the glass transition temperature measurement. The glass transition temperature (in ° C.) of each sample was measured using a dynamic mechanical analysis (DMA) method by reference to IPC-TM-650 2.4.24.4 at a temperature range of 35° C. to 270° C. with a temperature increase rate of 2° C./minute. Higher glass transition temperature is better.

Copper Foil Peeling Strength (a.k.a. Peeling Strength, P/S)

The aforesaid copper-containing laminate (obtained by laminating six prepregs) was cut into a rectangular sample with a width of 24 mm and a length of greater than 60 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate. In the technical field to which the present disclosure pertains, higher copper foil peeling strength is better. For a copper-clad laminate with a dissipation factor of less than 0.0040 under a 10 GHz frequency, a difference in copper foil peeling strength of greater than 0.1 lb/in represents a significant difference (i.e., significant technical difficulty).

T300 Thermal Resistance

The copper-containing laminate (obtained by laminating six prepregs, having a resin content of about 55%) was used in the T300 thermal resistance test. At a constant temperature of 300° C., a thermomechanical analyzer (TMA) was used by reference to IPC-TM-650 2.4.24.1 "Time to Delamination (TMA Method)" to measure each specimen and record the time to delamination. If no delamination was observed at the $120^{th}$ minute, a designation of ">120" was given.

Dissipation Factor (Df)

The aforesaid copper-free laminate (obtained by laminating two prepregs, having a resin content of about 70%) was subject to dissipation factor measurement. Each sample was measured by using a microwave dielectrometer (available from AET Corp.) by reference to JIS C2565 at room temperature (about 25° C.) and under a 10 GHz frequency. Lower dissipation factor represents better dielectric properties of the specimen. Under a 10 GHz frequency, for a Df value of less than 0.0040, a difference in Df of less than 0.0001 represents no substantial difference (i.e., no significant technical difficulty) in dissipation factor of different laminates, and a difference in Df of greater than or equal to 0.0001 represents a substantial difference in dissipation factor of different laminates.

Compositions and test results of resin compositions of Examples and Comparative Examples are listed below (in part by weight):

TABLE 1

Resin compositions of Examples (in part by weight) and test results

| Component | Name | E1 | E2 | E3 | E4 | E5 | E6 |
|---|---|---|---|---|---|---|---|
| polyphenylene ether resin | SA-9000 | 100 | 50 | 100 | 100 | 100 | 100 |
| | OPE-2st | | 50 | | | | |
| | SA-90 | | | | | | |
| polyolefin | Ricon 156 | 17 | 17 | 17 | 17 | 17 | 17 |
| | Ricon 181 | | | | | | |
| | H-1051 | | | | | | |
| crosslinking agent | BMI-80 | | | | | | |
| | TAC | | | | | | |

TABLE 1-continued

Resin compositions of Examples (in part by weight) and test results

| | | | | | | | |
|---|---|---|---|---|---|---|---|
| ionic compound | TAIC | | | | | | |
| | IXE-700F | 1 | 1 | 0.15 | 1.5 | 3.5 | 5 |
| | IXE-100 | | | | | | |
| | IXE-800 | | | | | | |
| | IXE-770D | | | | | | |
| polymerization inhibitor | hydroquinone | | | | | | |
| peroxide | 25B | 0.4 | 0.4 | 0.4 | 0.4 | 0.4 | 0.4 |
| inorganic filler | SC-2500SVJ | 70 | 70 | 70 | 70 | 70 | 70 |
| solvent | toluene | 130 | 130 | 130 | 130 | 130 | 130 |
| | dimethylacetamide | 30 | 30 | 30 | 30 | 30 | 30 |

| Property | Unit | E1 | E2 | E3 | E4 | E5 | E6 |
|---|---|---|---|---|---|---|---|
| Tg | °C. | 195 | 199 | 190 | 202 | 205 | 196 |
| P/S | lb/in | 3.31 | 3.33 | 3.30 | 3.35 | 3.37 | 2.82 |
| T300 thermal resistance | minute | >120 | >120 | >120 | >120 | >120 | 60 |
| Df | none | 0.0037 | 0.0037 | 0.0037 | 0.0038 | 0.0038 | 0.0047 |

TABLE 2

Resin compositions of Examples (in part by weight) and test results

| Component | Name | E7 | E8 | E9 | E10 | E11 | E12 |
|---|---|---|---|---|---|---|---|
| polyphenylene ether resin | SA-9000 | 100 | 100 | 100 | 100 | | 50 |
| | OPE-2st | | | | | 100 | 50 |
| | SA-90 | | | | | | |
| polyolefin | Ricon 156 | 15 | 17 | 17 | 17 | 17 | 8 |
| | Ricon 181 | | | | | | 8 |
| | H-1051 | | | | | | 8 |
| crosslinking agent | BMI-80 | | | 15 | 30 | | 10 |
| | TAC | | | | | | 15 |
| | TAIC | | 33 | | | | |
| ionic compound | IXE-700F | 1 | 1 | 1 | 1 | 1 | 1 |
| | IXE-100 | | | | | | |
| | IXE-800 | | | | | | |
| | IXE-770D | | | | | | |
| polymerization inhibitor | hydroquinone | | | | | | |
| peroxide | 25B | 0.4 | 0.4 | 0.4 | 0.4 | 0.4 | 0.3 |
| inorganic filler | SC-2500SVJ | 70 | 70 | 70 | 70 | 70 | 85 |
| solvent | toluene | 130 | 130 | 130 | 130 | 130 | 110 |
| | dimethylacetamide | 30 | 30 | 30 | 30 | 30 | 50 |

| Property | Unit | E7 | E8 | E9 | E10 | E11 | E12 |
|---|---|---|---|---|---|---|---|
| Tg | °C. | 196 | 200 | 211 | 214 | 196 | 202 |
| P/S | lb/in | 3.32 | 3.42 | 3.35 | 3.30 | 3.37 | 3.31 |
| T300 thermal resistance | minute | >120 | >120 | >120 | >120 | >120 | >120 |
| Df | none | 0.0039 | 0.0037 | 0.0038 | 0.0039 | 0.0036 | 0.0039 |

TABLE 3

Resin compositions of Comparative Examples (in part by weight) and test results

| Component | Name | C1 | C2 | C3 | C4 | C5 | C6 | C7 |
|---|---|---|---|---|---|---|---|---|
| polyphenylene ether resin | SA-9000 | 100 | | | 100 | 100 | 100 | 100 |
| | OPE-2st | | | | | | | |
| | SA-90 | | 100 | | | | | |
| polyolefin | Ricon 156 | 17 | 17 | 17 | 17 | 17 | 17 | 17 |
| | Ricon 181 | | | 100 | | | | |
| | H-1051 | | | | | | | |
| crosslinking agent | BMI-80 | | | | 30 | | | |
| | TAC | | | | | | | |
| | TAIC | | | | | | | |
| ionic compound | IXE-700F | | 1 | 1 | | | | |
| | IXE-100 | | | | | 1 | | |

TABLE 3-continued

Resin compositions of Comparative Examples (in part by weight) and test results

|  |  |  |  |  |  |  |  |  |
|---|---|---|---|---|---|---|---|---|
|  | IXE-800 |  |  |  |  | 1 |  |  |
|  | IXE-770D |  |  |  |  |  | 1 |  |
| polymerization inhibitor | hydroquinone |  |  |  |  |  |  | 1 |
| peroxide | 25B | 0.4 | 0.4 | 0.4 | 0.4 | 0.4 | 0.4 | 0.4 |
| inorganic filler | SC-2500SVJ | 70 | 70 | 70 | 70 | 70 | 70 | 70 |
| solvent | toluene | 130 | 130 | 130 | 130 | 130 | 130 | 130 |
|  | dimethyl acetamide | 30 | 30 | 30 | 30 | 30 | 30 | 30 |

| Property | Unit | C1 | C2 | C3 | C4 | C5 | C6 | C7 |
|---|---|---|---|---|---|---|---|---|
| Tg | ° C. | 187 | 127 | failed to be formed | 187 | 186 | 186 | 182 |
| P/S | lb/in | 3.25 | 1.94 |  | 3.01 | 3.27 | 3.22 | 3.10 |
| T300 thermal resistance | minute | >120 | 30 |  | 90 | 60 | 45 | 30 |
| Df | none | 0.0039 | 0.0079 |  | 0.0039 | 0.0041 | 0.0041 | 0.0060 |

The following observations can be made according to the test results above.

The comparison of Examples E1 to E12 with Comparative Examples C1 and C4 to C6, wherein Comparative Example C1 does not contain any magnesium and aluminum combination ionic compound, Comparative Example C4 contains a zirconium-based ionic compound having a thermal resistance of 550° C., Comparative Example C5 contains a zirconium-based ionic compound having a thermal resistance of 300° C., and Comparative Example C6 contains a magnesium and aluminum combination ionic compound having a thermal resistance of 300° C., indicates that articles made from these Comparative Examples fail to achieve a desirable glass transition temperature (i.e., greater than or equal to 190° C.), while Examples E1 to E12 all achieve a glass transition temperature of greater than or equal to 190° C.

The comparison of Examples E1 to E12 with Comparative Examples C2 and C3, wherein Comparative Example C2 contains a dihydroxyl polyphenylene ether resin in place of a vinyl group-containing polyphenylene ether resin and Comparative Example C3 contains additional polyolefin in place of a vinyl group-containing polyphenylene ether resin, indicates that articles made from these Comparative Examples fail to achieve a desirable glass transition temperature or fail to be formed, while Examples E1 to E12 all achieve a glass transition temperature of greater than or equal to 190° C.

In addition, the test results above confirm that all Examples E1 to E12 implementing the technical solution provided by the present disclosure can all achieve a glass transition temperature of greater than or equal to 190° C. In addition, in contrast to Example E6 which contains 5 parts by weight of a magnesium and aluminum combination ionic compound having a thermal resistance of greater than or equal to 600° C., all other Examples contain 0.15 to 3.5 parts by weight of a magnesium and aluminum combination ionic compound having a thermal resistance of greater than or equal to 600° C. in conjunction with a vinyl group-containing polyphenylene ether resin and a polyolefin, indicating that if a specific amount or ratio range of the magnesium and aluminum combination ionic compound having a thermal resistance of greater than or equal to 600° C. is used, improvements in other properties can be further achieved, including but not limited to any one or more of a copper foil peeling strength of greater than or equal to 3.30 lb/in, a T300 thermal resistance of greater than 120 minutes and a dissipation factor of less than or equal to 0.0040.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising: 100 parts by weight of a vinyl group-containing polyphenylene ether resin, 15 to 24 parts by weight of a polyolefin and 0.15 to 3.5 parts by weight of a magnesium and aluminum combination ionic compound, wherein the magnesium and aluminum combination ionic compound has a thermal resistance of greater than or equal to 600° C.

2. The resin composition of claim 1, wherein the vinyl group-containing polyphenylene ether resin comprises a vinylbenzyl group-containing polyphenylene ether resin, a methacrylate group-containing polyphenylene ether resin, an allyl group-containing polyphenylene ether resin, a chain-extended vinyl group-containing polyphenylene ether resin or a combination thereof.

3. The resin composition of claim 1, wherein the polyolefin comprises styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene terpolymer, styrene-ethylene-butylene-styrene terpolymer, polybutadiene, maleic anhydride-butadiene copolymer or a combination thereof.

4. The resin composition of claim 1, further comprising: a maleimide resin, a small molecule vinyl compound, an acrylate, an epoxy resin, a cyanate ester resin, a phenolic resin, a benzoxazine resin, a polyester resin, a curing agent, a polyamide resin, a polyimide resin or a combination thereof,
    wherein the small molecule vinyl compound comprises bis(vinylbenzyl) ether, bis(vinylphenyl)ethane, triallyl isocyanurate, triallyl cyanurate, 1,2,4-trivinyl cyclohexane or a combination thereof,
    wherein the acrylate comprises tricyclodecane di(meth)acrylate, tri(meth)acrylate, 1,1'-[(octahydro-4,7-methano-1H-indene-5,6-diyl) bis(methylene)]ester or a combination thereof, and
    wherein the curing agent is an amine.

5. The resin composition of claim 1, further comprising: flame retardant, inorganic filler, curing accelerator, polymerization inhibitor, solvent, silane coupling agent, coloring agent, toughening agent or a combination thereof,
    wherein the flame retardant comprises ammonium polyphosphate, hydroquinone bis-(diphenyl phosphate), bisphenol A bis-(diphenylphosphate), tri(2-carboxyethyl) phosphine, phosphoric acid tris(chloroisopropyl) ester, trimethyl phosphate, dimethyl methyl phosphonate, resorcinol bis(dixylenyl phosphate), phosphazene, melamine polyphosphate, 9,10-dihydro-9-oxa-10-phosphaphenanthrene-10-oxide or 9,10-dihydro-9-oxa-10-phosphaphenanthrene-10-oxide group-containing resin, diphenylphosphine oxide or diphenylphosphine oxide group-containing resin, melamine cyanurate, tri-hydroxy ethyl isocyanurate, aluminium phosphate, or a combination thereof,
    wherein the inorganic filler comprises silica, aluminum oxide, aluminum hydroxide, magnesium oxide, magnesium hydroxide, calcium carbonate, aluminum nitride, boron nitride, aluminum silicon carbide, silicon carbide, silicon nitride, titanium dioxide, zinc oxide, zirconium oxide, mica, boehmite, calcined talc, talc, silicon nitride or calcined kaolin, and
    wherein the toughening agent comprises carboxyl-terminated butadiene acrylonitrile rubber, core-shell rubber, or a combination thereof.

6. An article made from the resin composition of claim 1, comprising a prepreg, a resin film, a laminate or a printed circuit board.

7. The article of claim 6, having a glass transition temperature as measured by reference to IPC-TM-650 2.4.24.4 of greater than or equal to 190° C.

8. The article of claim 6, having a copper foil peeling strength as measured by reference to IPC-TM-650 2.4.8 of greater than or equal to 3.30 lb/in.

9. The article of claim 6, having a T300 thermal resistance as measured by reference to IPC-TM-650 2.4.24.1 of greater than 120 minutes.

10. The article of claim 6, having a dissipation factor as measured by reference to JIS C2565 at 10 GHz of less than or equal to 0.0040.

* * * * *